United States Patent [19]
Weaver et al.

[11] Patent Number: 6,121,351
[45] Date of Patent: *Sep. 19, 2000

[54] THERMOPLASTIC COMPOSITIONS CONTAINING ANTHRAQUINONE POLYSULFONAMIDE COLORANTS

[75] Inventors: Max Allen Weaver; Wayne Payton Pruett, both of Kingsport; Kay Hunt Shackelford, Johnson City; Samuel David Hilbert, Jonesborough, all of Tenn.

[73] Assignee: Eastman Chemical Company, Kingsport, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,647

[22] Filed: Aug. 7, 1997

Related U.S. Application Data

[60] Provisional application No. 60/025,367, Sep. 3, 1996.

[51] Int. Cl.$^7$ .................. C08J 5/10; C08L 81/10
[52] U.S. Cl. ............. 524/161; 524/89; 524/240; 524/271; 525/437; 525/540; 528/289; 528/290; 528/295; 523/507
[58] Field of Search .............. 524/161, 89, 240, 524/271; 525/437, 540; 528/289, 290, 295; 523/507

[56] References Cited

U.S. PATENT DOCUMENTS

| | | |
|---|---|---|
| 2,731,476 | 1/1956 | Peter et al. . |
| 3,299,103 | 1/1967 | Maier . |
| 4,116,923 | 9/1978 | Gattner et al. . |
| 4,403,092 | 9/1983 | Davis et al. . |
| 4,477,635 | 10/1984 | Mitra . |
| 5,032,670 | 7/1991 | Parham et al. . |
| 5,106,942 | 4/1992 | Krutak et al. . |
| 5,194,463 | 3/1993 | Krutak et al. . |
| 5,453,482 | 9/1995 | Weaver et al. . |
| 5,650,481 | 7/1997 | Yau et al. ........................ 528/280 |

FOREIGN PATENT DOCUMENTS

| | | |
|---|---|---|
| 92 07913A | 5/1992 | WIPO . |
| 92/07913 | 5/1992 | WIPO . |
| 92/13921 | 8/1992 | WIPO . |

OTHER PUBLICATIONS

K. Vendataraman, Editor, The Chemistry of Synthetic Dyes, vol. 8, Academic Press, New York, 1978, pp. 81–131 (no month).

R. Gächter and H. Müller, Editors, Plastics Additives Handbook, Hansu Publishers, New York, 1985, pp 507–533; 729–741 (no month).

N. Ohta, Photographic Science and Engineering, vol. 15, No. 5, Sep.–Oct. 1971, pp 395–415 (no month).

*Primary Examiner*—Blaine Copenheaver
*Assistant Examiner*—John J. Guarriello
*Attorney, Agent, or Firm*—Karen A. Harding; Harry J. Gwinnell

[57] ABSTRACT

Thermoplastic compositions containing certain anthraquinone polysulfonamide colorants incorporated therein as toners or colorants. The anthraquinone colorant moieties which are incorporated into the polymer chain of the polysulfonamide colorants are not leachable, sublimable or extractable and do not exude from the thermoplastic compositions. The anthraquinone polysulfonamide colorants may be added to the thermoplastic polymers during production or melt blended with the polymer by conventional techniques to produce transparent thermoplastic compositions useful for a variety of end uses where nonmigrating or nonextractable colorants are needed.

20 Claims, No Drawings

THERMOPLASTIC COMPOSITIONS CONTAINING ANTHRAQUINONE POLYSULFONAMIDE COLORANTS

This application claims benefit of Provisional application Ser. No. 60/025,367 filed Sep. 3, 1996.

BACKGROUND OF THE INVENTION

1. Field of the Invention

This invention relates to thermoplastic compositions containing certain anthraquinone polysulfonamide colorants incorporated therein as toners or colorants. Since the anthraquinone colorant moieties are incorporated into the polymer chain of the polysulfonamide colorants, they are not leachable, sublimable or extractable and do not exude from the thermoplastic compositions. The anthraquinone polysulfonamide colorants may be added to the thermoplastic polymers during production or melt blended with the polymer by conventional techniques to produce transparent thermoplastic compositions useful for a variety of end uses where nonmigrating or nonextractable colorants are needed.

Thermoplastics are typically colored by organic pigments when superior brilliance and tinctorial strength are important. Opacity, however, is introduced into the polymer composition as a result of the insoluble pigment. Also, toxicity considerations have presented chronic problems relative to the use of organic pigments, since some have been shown to be potential carcinogens and to cause contact dermatitis.

Plastics are also colored by using color concentrates consisting of physical admixtures of polymers and colorants (usually solvent dyes). However, the use of such physical admixtures to color polymeric materials such as polyester, e.g., poly(ethylene terephthalate) and blends thereof, present a number of problems:

1. Colorant migration during drying of the colored polyester pellets.
2. Colorant migration during extrusion and colorant accumulation on dies or plateout on rollers which can cause shutdowns for clean-up. Such colorant migration and accumulation result in time consuming and difficult clean-up, particularly when a polymer of another color is subsequently processed on the same equipment.
3. Colorants may not mix well, for example, when using two or more color concentrates to obtain a particular shade.
4. Colorants may diffuse or exude during storage and use of the colored polymeric material.

The use of polysulfonamide colorants eliminate or minimize the aforementioned problems associated with the use of conventional dyes and pigments.

2. Description of the Prior Art

It is well-known in the art to color thermoplastic resins by adding pigments or solvent dyes (e.g. see Thomas G. Weber, Editor, Coloring of Plastics, John Wiley and Sons, New York, 1979). The use of pigments, however, is accompanied by undesirable properties such as opacity, dullness of color, low tinctorial strength, etc. Also, difficulties in blending the insoluble pigments uniformly with the thermoplastic resin are encountered. Also, useful for coloring thermoplastic resins are solvent dyes (K. Vendataraman, Editor, The Chemistry of Synthetic Dyes, Vol. 8, Academic Press, New York, 1978, pp 81–131), which give compositions having improved clarity, brightness in hue and high tinctorial strength, but which may lead to dye migration, extraction, etc. from the colored thermoplastic resin. These problems are of particular concern when solvent dyes are used to color flexible resins such as polyvinyl chloride, polyethylene and polypropylene which have low glass transition temperatures.

It is known, also, to prepare solvent soluble nonextractable polymeric aminotriarylmethane dyes having polyester, polycarbonate, polyurethane, or polyethyleneimine backbones and to incorporate them into resins such as polyvinyl chloride, polyvinylidene chloride and acrylic resins such as poly(methyl methacrylate) etc. by solvent blending techniques [S. Mitra (to 3M Corp.), U.S. Pat. No. 4,477,635 (1984)]. Difficulties are encountered in preparing these polymeric colored compounds because a non-colored intermediate aromatic amine containing polymer must be prepared and then the aromatic amine moiety in the polymer structure must be converted into the aminotriarylmethane moiety by further reaction with a diaryl ketone in the presence of condensation catalyst such as phosphorous oxychloride in an inert organic solvent. These previously disclosed polymeric aminotriarylmethane compositions also do not have the requisite thermal stability for use in coloring thermoplastic resins via the more favorable method of melt blending when high temperatures are encountered.

It is further known from U.S. Pat. No. 4,116,923 (1978) to color plastics, in particular polyolefins, with low melting, cross-linked colored polyester compositions containing residues of terephthalic acid, isophthalic acid, or both, a low-molecular weight trimethylol alkane, i.e. 1,1,1-triethylol propane and a copolymerizable colorant, said colorant being present at a level of 0.1–25% by weight. Difficulties are encountered, however, in preparing these highly cross-linked colored polymers as extreme care as regards to the temperature, amount of vacuum, the level of colorant present and the reaction time is necessary to attempt to reproduce the same quality of cross-linked colored polyester composition. Furthermore, these colored polyester compositions are brittle and low melting and may cause deterioration in physical properties of thermoplastic resins when added in quantities sufficient to produce a high level of coloration. Critical in the preparation of these previously disclosed polymers is the achievement of a low degree of polymerization to give a low melting polymer which has adequate solubility characteristics in the resin to be colored; however, to accomplish this the colorant may not be copolymerized, particularly when added at high levels, thus leading to undesirable extractable colorant.

Additionally, it is known to produce polyester color concentrates having colorants copolymerized therein and to use these for coloring thermoplastics (See U.S. Pat. No. 5,032,670; U.S. Pat. No. 5,106,942; WO 92/07913; WO 92113921). The polycondensation reactions required to prepare these polymeric colorants require high temperature conditions (>250° C.) and continuous large scale processing to be cost effective, in contrast to the polysulfonamide colorants of this invention which can be prepared at relatively low temperatures (e.g. usually 100° C., or less) in batch processing equipment.

Finally, it is known (U.S. Pat. No. 5,194,463) to color thermoplastics using polyurethane color concentrates; however, these colorants have the inherent disadvantage of being derived from diisocyanate compounds as one of the reactants, which are known to be toxic and difficult to handle safely on a large scale.

This invention provides thermoplastic compositions comprising one or more thermoplastic materials and one or more anthraquinone polysulfonamide colorants. The colorant may be added during the preparation of the thermoplastic or afterwards via melt blending techniques.

SUMMARY OF THE INVENTION

The invention provides a colored thermoplastic composition which comprises at least one thermoplastic polymer having combined therewith at least one colorant having the formula I:

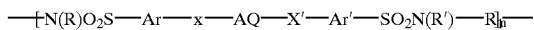

wherein:
- AQ is a divalent anthraquinone radical which may be substituted with from 1 to 6 substituents which may be the same or different and are selected from $C_1$–$C_8$ alkyl, $C_1$–$C_8$ alkoxy, $C_1$–$C_8$ alkanolyamino, aroylamino, $C_1$–$C_8$ alkylthio, halogen, amino, nitro, $C_1$–$C_8$ alkylamino, $C_3$–$C_8$ cycloalkylamino, $C_1$–$C_8$ alkanoyl, $C_1$–$C_8$ alkoxy-carbonyl, trifluoromethyl, cyano, $C_3$–$C_8$ cycloalkoxy, $C_3$–$C_8$ cycloalkylthio, heteroarylthio, $C_1$–$C_8$ alkylsulfonyl, arylsulfonyl, aroyl, carbamoyl, sulfamoyl, $C_1$–$C_8$ alkanoylamino, aroylamino, $C_1$–$C_8$ alkylsulfonamido, arylsulfonamido, arylthio, aryloxy, arylamino, and hydroxy groups;
- X and X' are independently Y, —Y—alkylene, —Y—alkylene—Y'—$)_m$, —Y— alkylene—$C_3$–$C_8$-cycloalkylene, Y—$C_3$–$C_8$-cycloalkylene—Y', or Y—alkylene—$C_3$–$C_8$-cycloalkylene—alkylene—Y', wherein m is 1–3, and Y and Y' are independently —O—, —S—, —N(R)CO—, —N(R)SO$_2$—, or —N($R_2$)—;
- Ar and Ar' are independently a divalent benzene or naphthalene radical which may be substituted with from 1 to 4 substituents which may be the same or different and are selected from $C_1$–$C_8$ alkyl, $C_1$–$C_8$ alkoxy, $C_1$–$C_8$ alkanolyamino, aroylamino, $C_1$–$C_8$ alkylthio and halogen groups;
- R and R' are independently hydrogen, $C_{1-C8}$ alkyl, $C_3$–$C_8$ cycloalkyl, heteroaryl or aryl;
- $R_1$ is a divalent organic radical, with the proviso that when $R_1$ is ethylene, R and R' may be combined to represent an ethylene radical;
- $R_2$ is hydrogen, $C_1$–$C_8$ alkyl, $C_3$–$C_8$ cycloalkyl, $C_1$–$C_8$ alkanoyl, aroyl, $C_1$–$C_8$ alkylsulfonyl, arylsulfonyl, carbamoyl, or sulfamoyl; and n is an integer of from about 3 to about 30.

The invention also provides a method of forming a thermoplastic composition which comprises melting a thermoplastic polymer and blending therewith a colorant having the above formula I.

The invention further provides a colored thermoplastic composition which comprises, at least one thermoplastic polymer having combined therewith at least one colorant having a unit of the above formula I.

The toned and colored thermoplastic compositions into which the colorants of the present invention are incorporated have a high enough molecular weight so that the resultant colored polymer will not be leachable, extractable, sublimable, migratable, etc. from the thermoplastic composition thus minimizing toxicity concerns with human exposure. The colored compositions are nonhazardous, have good brilliance, clarity, fastness to light, high heat stability, excellent homogeneity of colorant, and which normally maintain the desirable physical properties of the uncolored thermoplastic materials.

DETAILED DESCRIPTION OF THE PREFERRED EMBODIMENT

In accordance with the present invention thermoplastic compositions are produced by adding, during the preparation of the thermoplastics or by melt blending the thermoplastic, anthraquinone polysulfonamide colorants of the Formula I

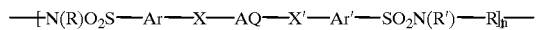

wherein:

Ar and Ar' each independently represent a divalent radical of the benzene or naphthalene series; X and X' are independently selected from Y, —Y—alkylene, —Y—alkylene—Y'$_m$, —Y—alkylene—$C_3$–$C_8$-cycloalkylene, Y—$C_3$–$C_8$-cycloalkylene—Y', Y—alkylene—$C_3$–$C_8$-cycloalkylene—alkylene—Y', wherein m is 1–3, Y and Y' are independently selected from —O—, —S—, —N(R)CO—, —N(R)SO$_2$—, and —N($R_2$)—, AQ is a divalent anthraquinone radical; R and R' are independently selected from hydrogen, $C_1$–$C_8$ alkyl, $C_3$–$C_8$ cycloalkyl, heteroaryl and aryl; $R_1$ is a divalent organic radical, with the proviso that when $R_1$ is ethylene, R and R' may be combined to represent an ethylene radical; and $R_2$ is selected from hydrogen, $C_1$–$C_8$ alkyl, $C_3$–$C_8$ cycloalkyl, $C_1$–$C_8$ alkanoyl, aroyl, $C_1$–$C_8$ alkylsulfonyl, arylsulfonyl, carbamoyl, and sulfamoyl; n is an integer of from about 3 to about 30, preferably an integer from about 5 to about 20.

Each divalent radical represented by Ar and Ar' may be further substituted with 1–4 groups which may be the same or different and are selected from $C_1$–$C_8$ alkyl, $C_1$–$C_8$ alkoxy, $C_1$–$C_8$ alkanolyamino, aroylamino, $C_1$–$C_8$ alkylthio and halogen.

The divalent anthraquinone radical (AQ) may be further substituted with 1–6 groups which may be the same or different and are selected from $C_1$–$C_8$ alkyl, $C_1$–$C_8$ alkoxy, $C_1$–$C_8$ alkanolyamino, aroylamino, $C_1$–$C_8$ alkylthio, halogen, amino, nitro, $C_1$–$C_8$ alkylamino, $C_3$–$C_8$ cycloalkylamino, $C_1$–$C_8$ alkanoyl, $C_1$–$C_8$ alkoxycarbonyl, trifluoromethyl, cyano, $C_3$–$C_8$ cycloalkoxy, $C_3$–$C_8$ cycloalkylthio, heteroarylthio, $C_1$–$C_8$ alkylsulfonyl, arylsulfonyl, aroyl, carbamoyl, sulfamoyl, $C_1$–$C_8$ alkanoylamino, aroylamino, $C_1$–$C_8$ alkylsulfonamido, arylsulfonamido, arylthio, aryloxy, arylamino, and hydroxy.

The organic radical $R_1$ can be selected from a wide variety of divalent linking groups including, $C_2$–$C_{12}$ alkylene, $C_3$–$C_8$ cycloalkylene, —CH$_2$—$C_3$–$C_8$ cycloalkylene-CH$_2$-, carbocyclic and heterocyclic arylene and these in combination. The alkylene linking groups may contain within or attached to their main chain one or more hetero atoms, e.g., oxygen, sulfur, nitrogen, substituted nitrogen, and/or cyclic groups such as $C_3$–$C_8$ cycloalkylene, carbocyclic arylene, divalent aromatic heterocyclic groups or ester/amide groups such as

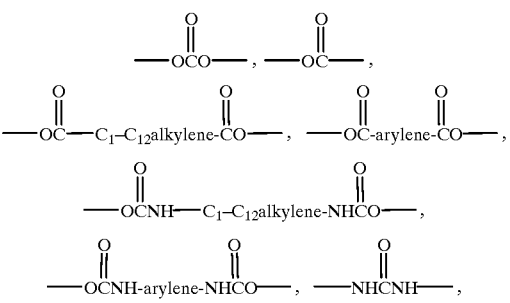

Examples of $C_2$–$C_{12}$ alkylene radicals containing cyclic moieties in the alkylene chain include

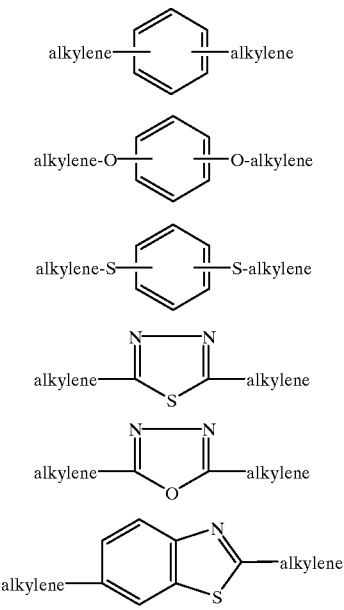

The cycloalkylene groups in the definition of $R_1$ are typically groups such as 1,2-; 1,3-; and 1,4-cyclohexylene. The carbocyclic arylene groups in the definition of $R_1$ include typically 1,2-; 1,3-; and 1,4-phenylene and 1,4-; 1,5-; 1,8-; 2,6-; and 2,7-naphthalenediyl and these substituted with one or more groups selected from $C_1$–$C_{12}$ alkyl, $C_1$–$C_{12}$ alkoxy and halogen.

Examples of the divalent heterocyclic arylene groups include unsubstituted and substituted triazines such as 1,3, 5-triazin-2,4-diyl-, 6-methoxy-1,3,5-triazin-2,4-diyl; diazines such as 2,4-pyrimidindiyl, 6-methyl-2,4-pyrimidindiyl, 6-phenyl-2,4-pyrimidindiyl, 3,6-pyridazindiyl and 2-methyl-3-oxo-4,5-pyrazindiyl; dicyano pyridines such as 3,5-dicyano-2,6-pyridindiyl; quinolines and isoquinolines such as 2,4-quinolindiyl and 2,8-isoquinolinediyl; quinoxalines such as 2,3-quinoxalindiyl; azoles such as 2,5-thiazoldiyl, 5-methylene-2-thiazolyl, 3,5-isothiazoldiyl, 5-methylene-3-isothiazolyl, 1,3,4-thiadiazol-2,5-diyl, 1,2,4-thiadiazol-3,5-diyl, 2,6- benzothiazoldiyl, 2,5-benoxazoldiyl, 2,6-benzimidazoldiyl, 6-methylene-2-benzothiazolyl and the group having the formula:

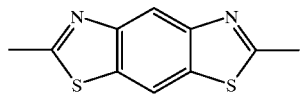

and maleimides such as 1-methyl-3,4-maleimidyl and 1-phenyl-3,4-maleimidediyl.

In addition to the possible substitution described above, the nitrogen atom of the nitrogen containing alkylene groups may be substituted, for example, with $C_1$–$C_8$ alkyl, aryl, $C_1$–$C_8$ alkanoyl, aroyl, $C_1$–$C_8$ alkylsulfonyl or carbamoyl, e.g.

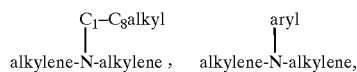

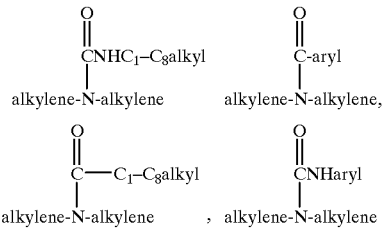

The term "alkylene" is used herein to represent straight or branched chain divalent hydrocarbon moieties having 1–8 carbons which may be further substituted by $C_1$–$C_8$ alkoxy, $C_1$–$C_8$ alkanoyloxy, aroyloxy, or halogen.

The term "$C_3$–$C_8$ cycloalkyl" is used to describe cycloaliphtic hydrocarbon radicals containing three to eight carbon atoms and these optionally substituted with $C_1$–$C_8$-alkyl, halogen, hydroxymethyl or $C_1$–$C_8$ alkanoyloxymethyl.

The term "$C_3$–$C_8$ cycloalkylene" is used to represent divalent cycloalkylene radicals containing from 3–8, preferably 5 or 6, ring carbons and which may be further substituted by $C_1$–$C_8$ alkyl or halogen.

The term "$C_1$–$C_8$ alkyl" is used to describe a monovalent straight or branched chain hydrocarbon radical which may be further substituted by one or more groups selected from $C_1$–$C_8$ alkoxy, $C_1$–$C_8$ alkanoyloxy, aroyloxy, $C_3$–$C_8$ cycloalkyl, cyano, aryl, heteroaryl, and halogen.

The term "halogen" is used to include fluorine, chlorine, bromine, and iodine.

The terms "aryl" and "aroyl" are used herein to describe a group wherein the aromatic portion is a phenyl or naphthyl radical, optionally substituted with one to four groups which may be the same or different and are selected from $C_1$–$C_8$ alkyl, $C_1$–$C_8$ alkoxy, $C_1$–$C_8$ alkylthio, $C_3$–$C_8$ cycloalkyl, halogen, carboxy, $C_1$–$C_8$-alkoxy carbonyl, $C_1$–$C_8$ alkanoylamino, benzoylamino, $C_1$–$C_8$ alkylsulfonamido, and benzenesulfonamido. The benzoyl and benzene radicals of benzoylamino and benzenesulfonamide may be further substituted by one or more groups selected from $C_1$–$C_8$ alkyl, $C_1$–$C_8$ alkoxy, and halogen, respectively.

The term "heteroaryl is used herein to represent mono or bicyclic hetero aromatic radicals containing at least one "hetero" atom selected from oxygen, sulfur, and nitrogen, or a combination of these atoms in combination with carbon to complete the aromatic ring. Examples of suitable heteroaryl groups include: thiazolyl, quinolinyl, benzothiazolyl, pyrazolyl, pyrrolyl, thienyl, furyl, thiadiazolyl, oxadiazolyl, benzoxazolyl, benzimidazolyl, pyridyl, pyrimidinyl, and triazolyl and such groups substituted 1–3 times with a group selected from halogen, $C_1$–$C_8$ alkyl, $C_1$–$C_8$ alkylthio, $C_1$–$C_8$ alkoxy, $C_1$–$C_8$ alkoxycarbonyl, $C_1$–$C_8$ alkanoylamino, aroylamino, $C_1$–$C_8$ alkylsulfonamido, or arylsulfonamido.

The term "arylene" as used herein preferably denotes divalent benzene and naphthalene radicals and these optionally substituted by one or more groups selected from $C_1$–$C_8$ alkyl, $C_1$–$C_8$ alkoxy, $C_1$–$C_8$ alkylthio, halogen, and $C_1$–$C_8$ alkoxycarbonyl. The preferred arylene groups are 1,2-; 1,3-; and 1,4-phenylene.

In the terms "$C_1$–$C_8$ alkoxycarbonyl"; "$C_1$–$C_8$ alkanoyl", "$C_1$–$C_8$ alkanoyloxy","$C_1$–$C_8$ alkanoylamino", "$C_1$–$C_8$ alkoxy", "$C_1$–$C_8$ alkysulfonyl", "$C_1$–$C_8$ alkylsulfonamido", "$C_1$–$C_8$ alkylthio" the alkyl portion of the groups have 1–8 carbons and are straight or branched chain hydrocarbon radicals, optionally substituted with one or more groups listed above as possible substitutents for the $C_1$–$C_8$ alkyl radicals.

The terms "carbamoyl" and "sulfamoyl" refer to groups of formulae $-CON(R_3)R_4$ and $-SO_2N(R_3)R_4$, respectively, wherein $R_3$ and $R_4$ are independently selected from hydrogen, $C_1$–$C_8$ alkyl, $C_3$–$C_8$ cycloalkyl, heteroaryl, and aryl.

A wide range of thermoplastic polymers useful for blending with the anthraquinone polysulfonamide colorants in the practice of the present invention are known in the art and includes homopolymers and copolymers of polyesters e.g., poly(ethylene terephthalate); polyolefins, e.g., polypropylene, polyethylene, linear low density polyethylene, polybutylene and copolymers made from ethylene, propylene and/or butylene; copolymers from acrylonitrile, butadiene and styrene; copolymers from styrene and acrylonitrile; polyamides, e.g., Nylon 6 and Nylon 66; polyvinyl chloride; polyurethanes; polyvinylidene chloride; polycarbonates; cellulose esters, e.g., cellulose acetate, propionate, butyrate or mixed esters; polyacrylates, e.g., poly(methyl methacrylate); polyimides; polyester-amides; polystyrene; etc.

The preferred thermoplastic polymers are polyesters, particularly poly(ethylene terephthalate), modified poly (ethylene terephthalate), polycarbonate, cellulose esters and polyamides, particularly Nylon 6 and Nylon 66.

According to the invention the anthraquinone polysulfonamide colorants are incorporated into the thermoplastic polymers using conventional techniques e.g., solution or melt-blending, such as those employed to incorporate other additives in such resins (see R. Gächter and H. Müller, Editors, Plastics Additives Handbook, Hansu Publishers, New York, 1985, pp 507–533; 729–741). For example, the colored polyester compositions may be dry blended in form of powders of pellets with the thermoplastic resin in the form of pellets or ground powders with or without an adhesion promoter or a dispersing agent. This premix can be subsequently processed on extruders or injection molding machines.

It is also within the scope of this invention to prepare a first thermoplastic composition containing one or more polysulfonamide colorants and then to prepare another second thermoplastic composition by melting and blending with an uncolored thermoplastic.

The actual amount of the anthraquinone polysulfonamide colorant used to color the thermoplastic polymer will depend upon the inherent tinctorial strength of the anthraquinone chromophore and the desired depth of shade. Typically, the amount of anthraquinone polysulfonamide colorant added to the thermoplastic polymer is such that the total amount by weight in the final thermoplastic polymer is such that the total amount by weight in the final thermoplastic polymer blend composition is from about 0.001% to about 20%, preferably from about 0.01% to about 10.

The colored thermoplastic polymer composition provided by the present invention are useful as thick and thin plastic films, extruded coatings and lamination layers, plastic sheeting, molded plastic articles and fibers.

When added as toners, e.g. to neutralize the yellow color produced in the manufacture of some condensation polymers such as poly(ethylene terephthalate) the anthraquinone polysulfonamide colorants are used at low levels such as from about 1 to about 10 parts per million (ppm), preferably from about 3 to about 8 ppm.

The particular chromophore groups present will, of course, determine the color (hue+value+chroma) of the anthraquinone polysulfonamide colorant and finally the color (hue+value+chroma) of the thermoplastic or polymer blends of the invention. A large gamut of colors may be obtained by blending two or more anthraquinone polysulfonamide colorants with the thermoplastic polymers to be colored, followed by molding or extruding or by first blending two or more anthraquinone polysulfonamide colorants together and then blending these premixed materials with the thermoplastic polymer or polymers to be colored. Alternatively, a concentrate of the anthraquinone polysulfonamide colorants in an appropriate vehicle may be prepared. The concentrate may be in the form of liquids, pastes, slurries, or solids, e.g., powders, compacted powders, pellets, etc., and may be incorporated by known methods into the thermoplastic polymer(s).

The anthraquinone polysulfonamide colorants of Formula I are prepared by the following general route:

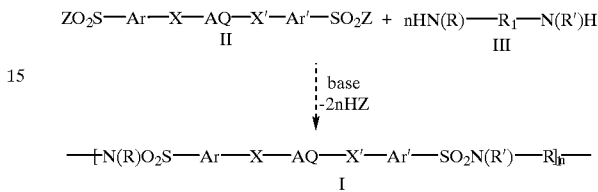

wherein Ar, Ar', X, X', AQ, R, R', $R_1$, and n are as previously defined and Z is fluoro, chloro, or bromo, preferably chloro. The dihalosulfonyl colorant compounds II, containing the anthraquinone chromophore, are reacted with diamines m in a solvent in the presence of an acid acceptor to yield the polysulfonamides of Formula I. Normally, the amide producing reactions are carried out at from about 25° C. up to 150° C., but usually at about 50° C. up to about 130° C. Suitable solvents are those in which II and III have sufficient solubility at the desired reaction temperature to facilitate reaction and which will not react with II or III, with aprotic solvents such as N,N-dimethyl formamide, N,N-dimethylacetamide, N-methylpyrrolidinone, hexamethylphosphoramide, dimethylsulfoxide and pyridine being particularly useful. Bases such as trialkylamines, e.g. triethylamine and tri-n-butylamine, N-alkylmorpholines, e.g. 4-methylmorpholine, N,N-dialkylpiperazines, e.g. 1,4-dimethylpiperazine, bicyclic nitrogen containing bases having non-hindered electron pairs, such as 1,8-biazabicyclo [5,4,0] undec-7-ene (DBU) and 1,4-diazadicyclo [2,2,2] octane (DABCO®), and alkali metal carbonates and bicarbonates, e.g. potassium carbonate are useful as acid acceptors to facilitate the polycondensation reaction.

Polysulfonamide colorants I may vary considerably in weight average molecular weight and still be useful; however, it is usually desirable that a weight average molecular weight of at least 1,500–2,000 be achieved to avoid problems related to extraction, migration, sublimation, etc. in the use of the colorants at high temperatures. If extremely high weight molecular weights are encountered, the polysulfonamides may not dissolve when used to color thermoplastics, thus functioning as pigments instead of dyes. Normally, a weight average molecular weight range is selected which avoids the problems connected with low weight average molecular weights and which will still allow the polysulfonamide colorants to be largely soluble in the thermoplastic substrate.

Typical dihalosulfonylanthraquinone intermediates II which are useful in the practice of the invention are presented in Table I and typical diamines are given in Table II. Any reactant in Table I may be reacted with any diamine of Table II to produce a polysulfonamide colorant.

TABLE I
Dihalosulfonylanthraquinones
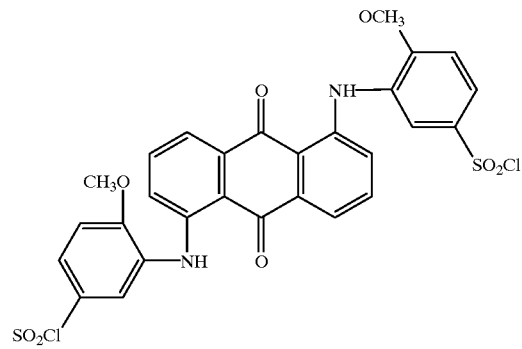
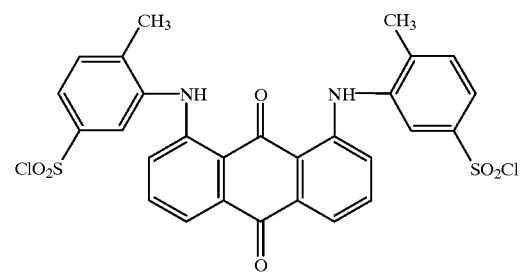
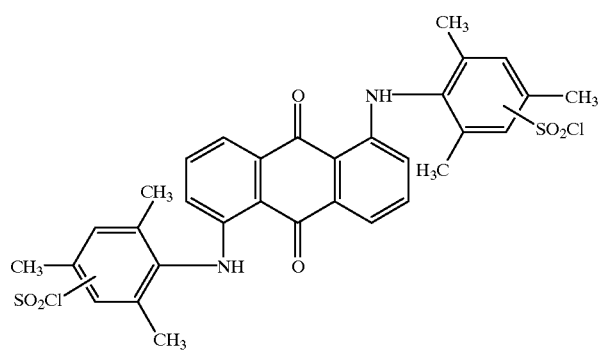
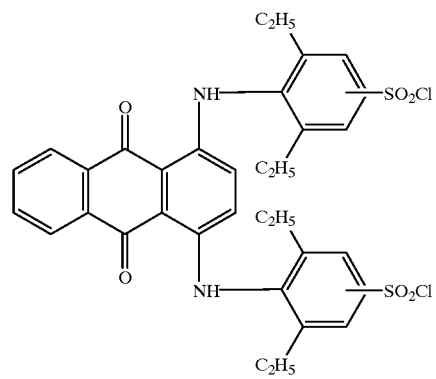

TABLE I-continued
Dihalosulfonylanthraquinones
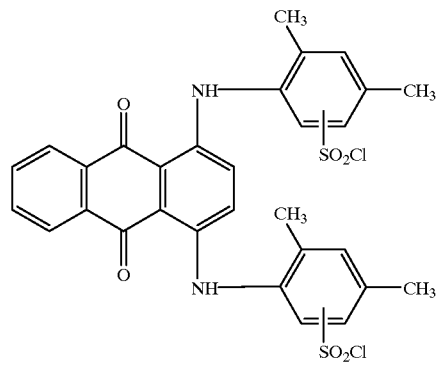
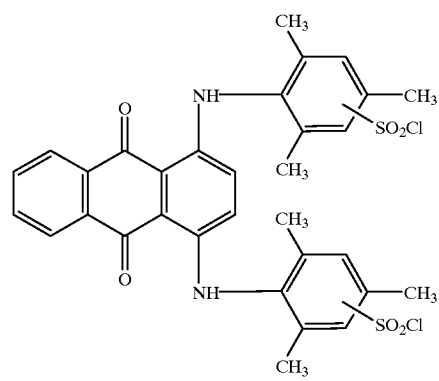
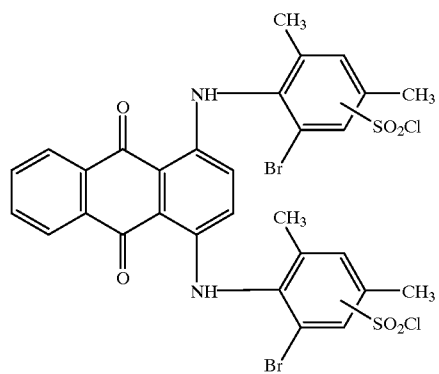
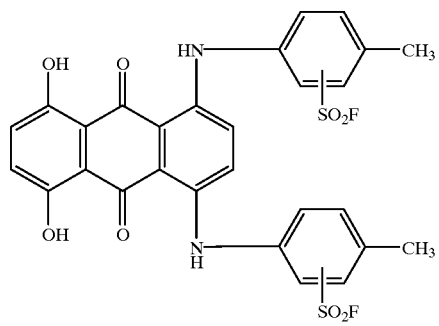

TABLE I-continued
Dihalosulfonylanthraquinones
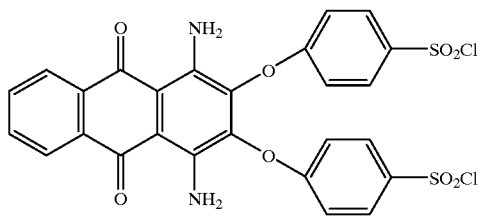
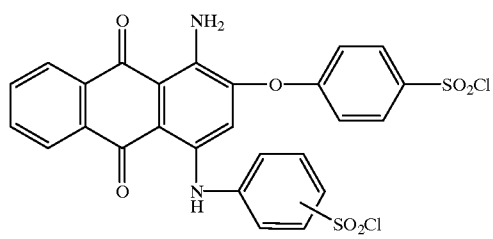
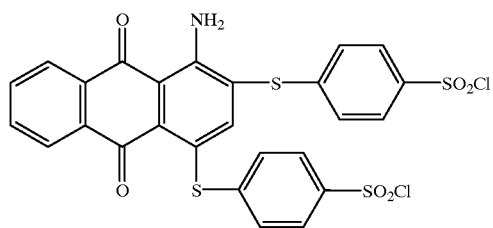
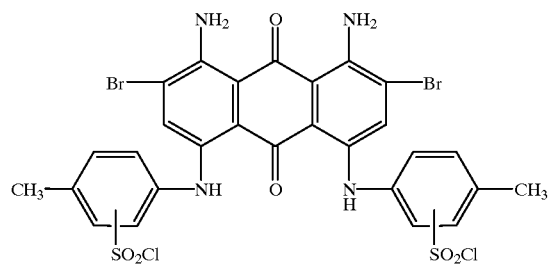
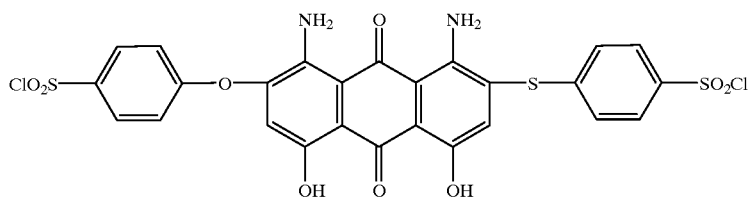
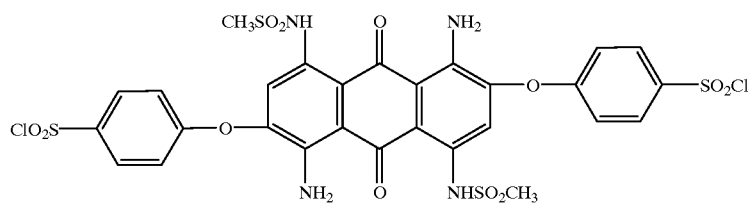

TABLE I-continued
Dihalosulfonylanthraquinones
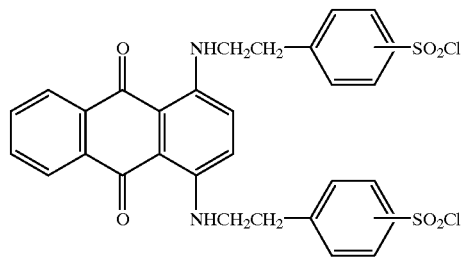
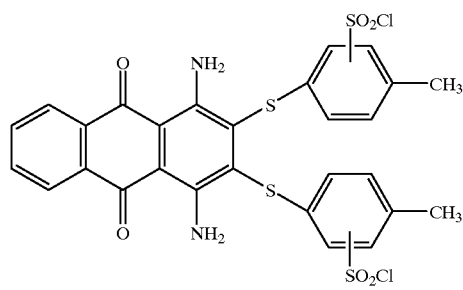
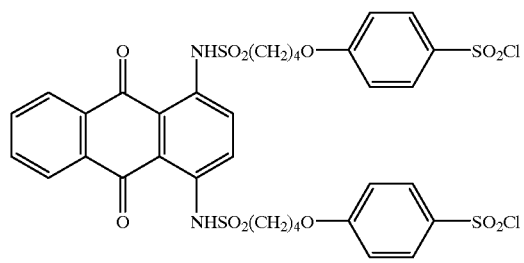
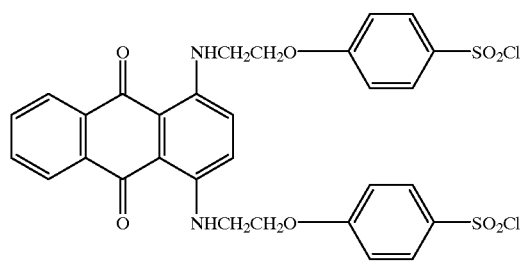
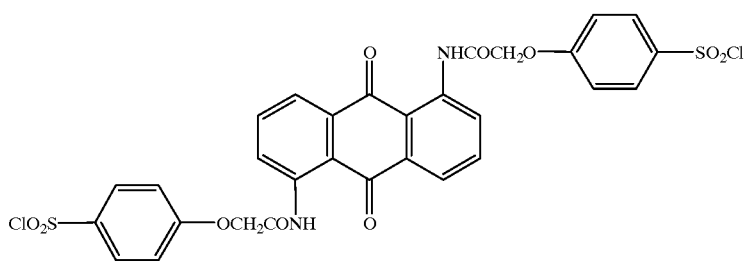

TABLE I-continued
Dihalosulfonylanthraquinones
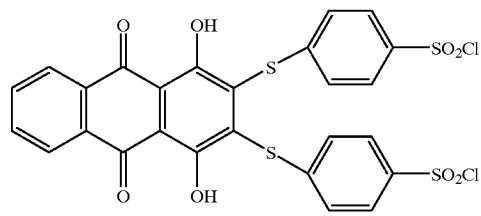
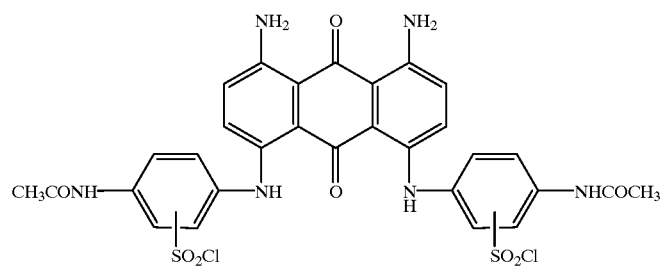
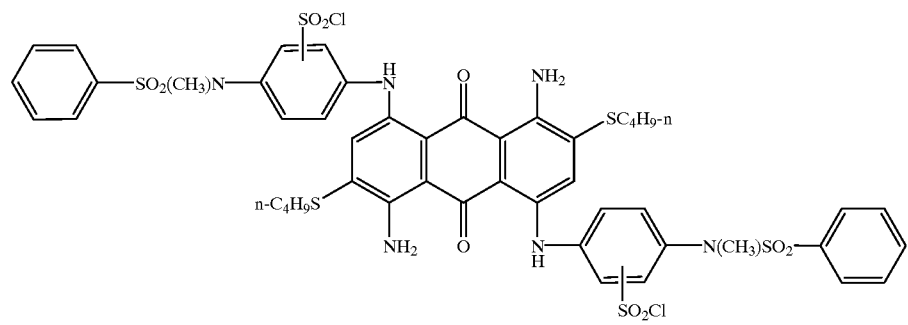
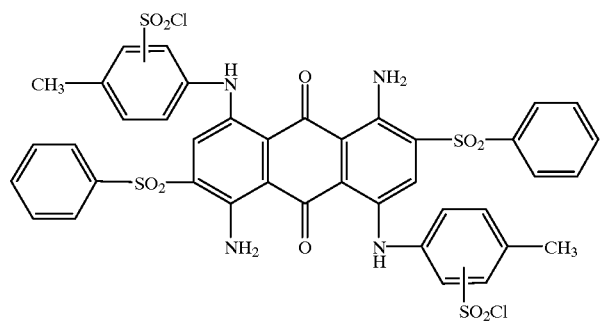
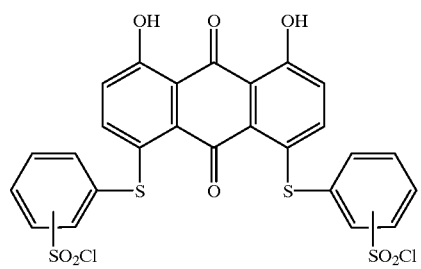

TABLE I-continued
Dihalosulfonylanthraquinones
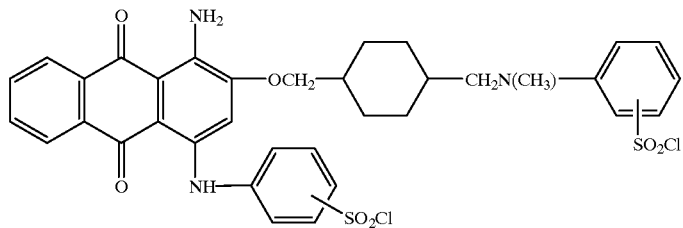
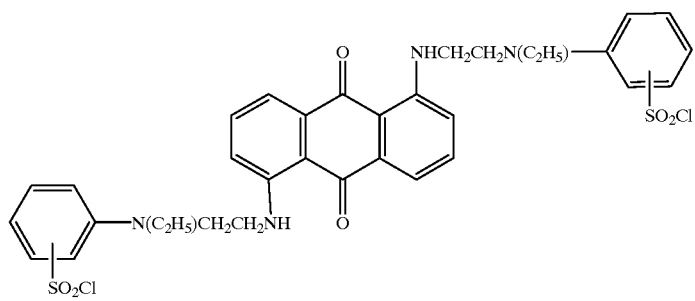
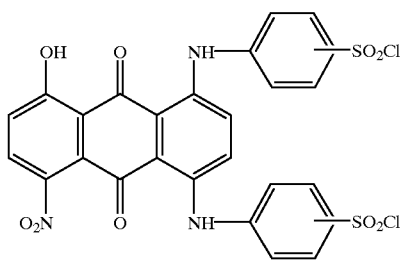
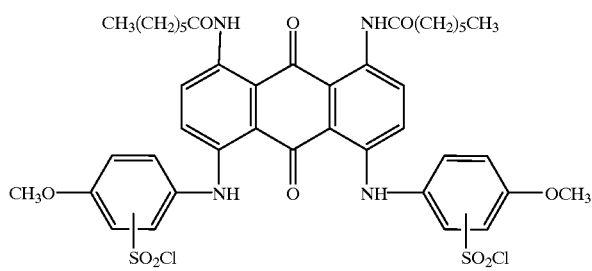
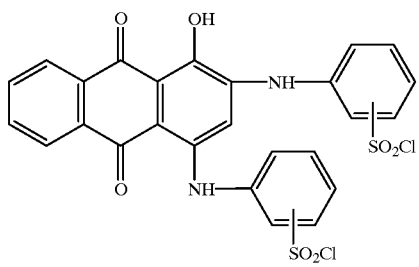

TABLE I-continued
Dihalosulfonylanthraquinones
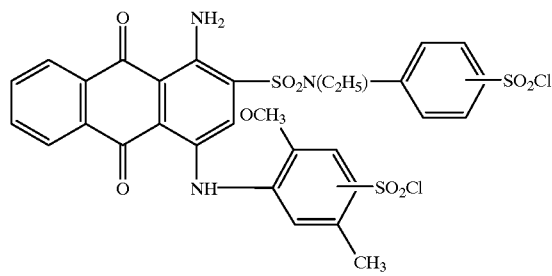
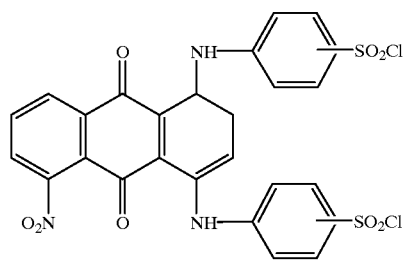
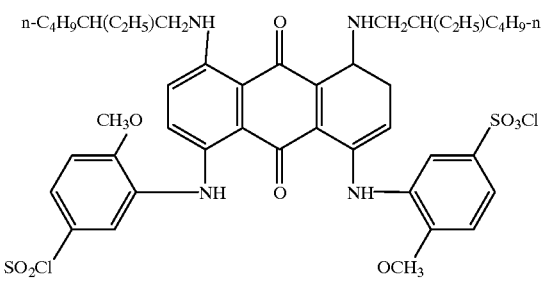
| TABLE II |
|---|
| Diamines |
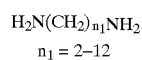
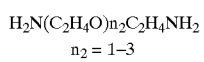
$H_2NCH_2CH_2-N(CH_3)CH_2CH_2NH_2$
$H_2NCH_2CH_2-N(COCH_3)CH_2CH_2NH_2$
| TABLE II-continued |
|---|
| Diamines |
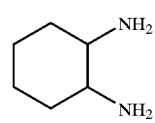
$HN(CH_3)(CH_2)_6N(CH_3)H$
$HN(CH_3)(CH_2)_6NH_2$
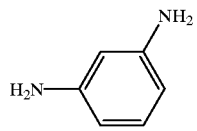

TABLE II-continued

Diamines

[Structure: 1,3-diamino-1,5,5-trimethylcyclohexane with CH2NH2]

[Structure: piperazine, H—N⟨NH]

[Structure: H2NCH2—C(CH3)2—CH2NH2]

H2NCH2CH2—N(C6H5)CH2CH2NH2

[Structure: H2N—CH2—C6H4—CH2—NH2 (para)]

[Structure: H2NCH2CH2N(piperazine)NCH2CH2NH2]

HN(CH3)CH2CH2N(CH3)H

[Structure: H2N—cyclohexyl—CH2NH2]

[Structure: H2N—C6H4—NH2 (para-phenylenediamine)]

[Structure: 2,4-diamino-toluene, CH3—C6H3(NH2)2]

[Structure: 1,2-diaminobenzene, o-C6H4(NH2)2]

[Structure: H2N—C6H4—C(CH3)2—C6H4—NH2]

[Structure: H2N—C6H4—CH2—C6H4—NH2]

TABLE II-continued

Diamines

[Structure: H2N—C6H4—CH2CH2—C6H4—NH2]

[Structure: 1,3-bis(aminomethyl)cyclohexane]

H2N(CH2)3—N(piperazine)N—(CH2)3NH2

[Structure: H2N—C6H4—Q—C6H4—NH2]

[Structure: H2N—C6H4—Q—(CH2)1–6—C6H4—NH2]

[Structure: H2N—C6H4—C6H4—NH2 (benzidine)]

[Structure: tetramethyl-p-phenylenediamine with 4 CH3 groups]

H2NCH2CH2N(C6H5)CH2CH2NH2

[Structure: H2N—C6H4—Q—(CH2)1–6—Q—C6H4—NH2]

[Structure: H2N—C6H4—(CH2)1–6—Q—(CH2)1–6—C6H4—NH2]

If desired, mixed colors may be prepared by selecting more than one colored dihalosulfonylanthraquinone intermediate and reacting with one or more diamines to produce "mixed" colors. For example, yellow, red, and blue, dihalosulfonylanthraquinones may be combined and reacted with the desired diamine to produce a black polysulfonamide colorant. As will be appreciated by those skilled in the art of color technology, a multiplicity of colors may be obtained by combining individual colors, e.g. substractive colors such as yellow, magenta, and cyan (see N. OHTA, Photographic Science and Engineering, Vol. 15, No. 5, Sept.–Oct. 1971, pp. 395–415). In the practice of this invention the individual colorant moieties may be combined at various stages:

a) two or more reactive dihalosulfonylanthraquinone intermediates are reacted with one or more diamines to give a colored polysulfonamide;

b) two or more colored polysulfonamides are combined and then added to thermoplastic materials by known methods.

The dihalosulfonylanthraquinone intermediate compounds II are normally prepared by reacting anthraquinone compounds IV containing two electron rich aryl groups with excess halosulfonic acid, e.g. chlorosulfonic, fluorosulfonic at temperatures at from about −10° C. to about 100° C., according to the following general Route I:

Route I $$\text{AR—X—AQ—X'—Ar'} \xrightarrow{\text{Excess halosulfonic acid}}$$
$$\text{IV}$$
$$\text{ZO}_2\text{S—Ar—X—AQ—X'—Ar'—SO}_2\text{Z}$$
$$\text{II}$$

wherein Ar, Ar', X, X', and Z have the meanings ascribed above. Typical procedures for the halosulfonation reactions are described in U.S. Pat. Nos. 2,731,476; 3,299,103; and 4,403,092 and in U.S. Ser. No. 210,785. It is also possible to sulfonate IV by contacting with sulfuric acid and/or oleum to produce the disulfonic acid derivatives V, Route II $$\text{AR—X—AQ—X'—Ar'} \xrightarrow{\text{SO}_3} \text{HO}_3\text{—Ar—X—AQ—X'—Ar'—SO}_3\text{H}$$
$$\text{IV} \qquad\qquad\qquad\qquad\qquad \text{V}$$
$$\downarrow \text{halogenating agent}$$
$$\text{ZO}_2\text{S—Ar—X—AQ—X'—Ar'—SO}_2\text{Z}$$
$$\text{II}$$

which may be converted into II by using various halogenating agents such as $POCl_3$, $PCl_5$, $PCl_3$, $PBr_3$, $SOCl_2$, $ClSO_3H$, etc. as presented in Route II.

The examples below further describes the present invention but is in no fashion intended to limit the scope thereof. The inherent viscosities specified herein are determined at 25° C. using 0.5 g of polymer per 100 ml of a solvent consisting of 60 weight percent phenol and 40 weight percent tetrachloroethane. The weight average molecular weight (Mw) and number average molecular weight (Mn) values referred to herein are determined by gel permeation chromatography. The melting temperatures are determined by differential scanning calorimetry on the first and/or second heating cycle at a scanning rate of 20° C. per minute and are reported as the peaks of the transitions.

EXAMPLE 1

To chlorosulfonic acid (250 ml) was added 1,5-bis(2-anisidino)anthraquinone (45.0 g, 0.10 m) with stirring at <35° C. After complete addition, the reaction solution was stirred at about 25° C. for 3.0 hours and then added gradually to acetone (4.0 L) with stirring and with external cooling to keep the temperature of the drowning mixture at <20° C. The solid di-sulfonyl chloride compound was collected by filtration, washed well with acetone and dried in air. The yield of product was 56.4 g (87.0% of the theoretical yield). Field desorption mass spectrometry (FDMS) gave a molecular ion mass of 646 from a tetrahydrofuran solution which supports the following desired structure:

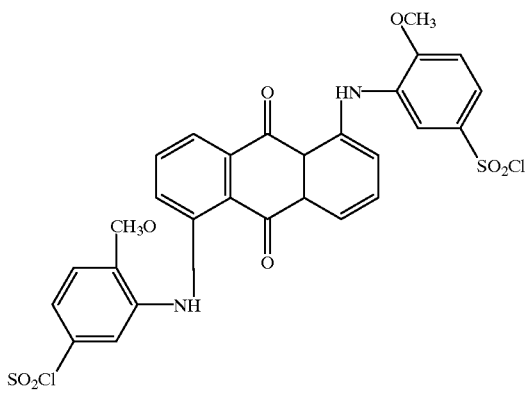

EXAMPLE 2

To chlorosulfonic acid (400 ml) was added 1,4-bis(2,6-diethylanilino)anthraquinone (50.0 g, 0.10 m) portionwise with stirring at <45° C. After being stirred overnight at room temperature, the reaction mixture was added with stirring to acetone (1.0 L), keeping the temperature below about 15° C. The solid thus produced was collected by filtration, washed with acetone (cooled to about 0° C.) and then dried in air. The yield of bright blue product was 47.3 g (67.8% of the theoretical yield). FDMS from a tetrahydrofuran solution of the product showed a molecular ion mass of 698 which supports the following desired structure:

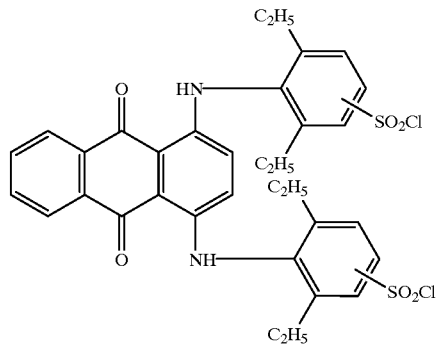

EXAMPLE 3

To fluorosulfonic acid (31.0 ml) was added 1,5-bis(4-tolylthio)anthraquinone (5 g) portionwise with good stirring. After being heated at 95–100° C. for 5 hrs, the reaction mixture was cooled and poured onto an ice/water (500 ml) mixture with stirring. The yellow solid was collected by filtration, washed with cold water and dried in air. The yield of product was 6.3 g (92% of the theoretical yield). FDMS from a DMF solution of the product showed a major molecular ion mass of 616–617 corresponding to the following desired disulfonyl fluoride product:

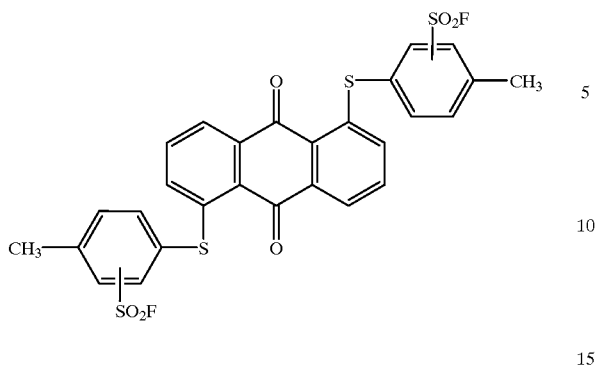

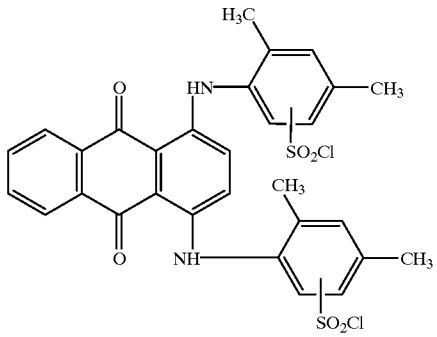

EXAMPLE 4

To chlorosulfonic acid (100 ml) was added portionwise, 1,5-bis(4-tolythio) anthraquinone (18.1 g, 0.04 m) with good stirring allowing the temperature to rise. The reaction mixture was then heated at 75–80° C. for 4 hrs, allowed to stand overnight and then drowned onto an ice/water mixture. The yellow solid which was collected by filtration, washed with water, was believed to have the following structure:

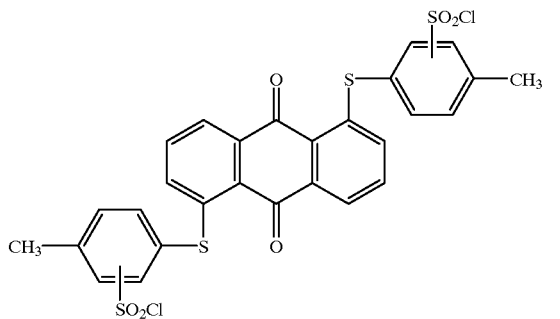

The product was left water-wet and used without further treatment as in Example 19 to prepare a yellow polysulfonamide colorant.

EXAMPLE 5

To chlorosulfonic acid (200 ml) was added portionwise with good stirring 1,4-bis(2,4-dimethylanilino) anthraquinone (44.6 g, 0.10 m) at 25–50° C. Without any external heating, the reaction mixture was stirred for 2 hrs, allowing the temperature to drop to ambient temperature. The reaction solution was then drowned onto ice/water mixture (2 L) and the blue product was collected by filtration, washed with water, and dried in air (yield—75.0 g). The product was believed to have the following structure:

EXAMPLE 6

To chlorosulfonic acid (100 ml) was added portionwise with stirring 1,4-bis(4-toluidino)-5,8-dihydroxyanthraquinone (20.0 g, 0.04 m) allowing the temperature to rise. After being heated at about 75° C. for 3 hrs, the reaction mixture was drowned onto an ice/water mixture. The green product was collected by filtration, washed with water, and was believed to have the following structure:

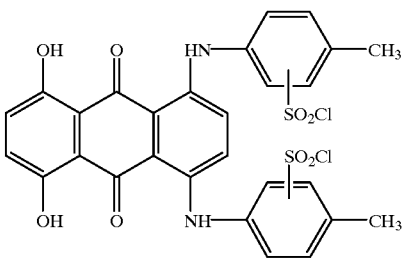

The product was left water-wet and reacted to give a green polysulfonamide colorant as described in Example 18.

EXAMPLE 7

A portion (3.24 g, 0.005 m) of the disulfonyl chloride of Example 1, was added portionwise to a stirred solution of 2,2-dimethyl-1,3-propanediamine (0.51 g, 0.005 m) and tri-n-butylamine (1.85 g, 0.01 m) dissolved in N,N-dimethylformamide (DMF) (20 ml) with good stirring. The reaction mixture was heated at 90–5° C. for 1 hr and then drowned into acetone (200 ml). The red polysulfonamide colorant was collected by filtration, washed with acetone, and dried in air (yield—2.34 g) and had a weight average molecular weight (Mw) of 9,163, a number average molecular (Mn) of 6,946, a polydispersity (Mw/Mn) of 1.32, a glass transition temperature (Tg) at 80° C. and a melting temperature (Tm) at 250° C. An absorption maximum ($\lambda$ max) was observed at 530 mn in the ultraviolet (UV)—visible light absorption spectrum in DMF solution.

EXAMPLE 8

A portion (3.24 g, 0.005 m) of the disulfonyl chloride of Example 1 was reacted with 1,6-hexamethylene diamine (0.58 g, 0.005 m) for 2 hrs and the solid product isolated as described in Example 7 (yield—2.49 g). The red polysulfonamide colorant had a Mw of 8,111, a Mn of 5,236, and a polydispersity (Mw/Mn) of 1.55.

EXAMPLE 9

A portion (3.24 g, 0.005 m) of the disulfonyl chloride of Example 1 was reacted with 1,4-bis(amino-methyl)

cyclohexane (0.68 g, 0.005 m) for 1.5 hrs and the solid product isolated as described in Example 7 (yield—2.97 g). The red polysulfonamide colorant had a Mw of 7,058, a Mn of 4,245, and a polydispersity of 1.67.

EXAMPLE 10

A portion (3.24 g, 0.005 m) of the disulfonyl chloride of Example 1 was reacted with N,N'-dimethylhexamethylene diamine (0.72 g, 0.005 m) for 3.5 hrs and the solid polymeric product isolated as described in Example 7 (3.0 g). The red polysulfonamide colorant had a Mw of 10,289, a Mn of 3,937, and a polydispersity of 2.61.

EXAMPLE 11

A portion (3.24 g, 0.005 m) of the disulfonyl chloride of Example 1 was reacted with 1,4-phenylene diamine (0.54 g, 0.005 m) for 2.0 hrs and the solid product isolated as described in Example 7. The red polysulfonamide colorant had a Mw of 2,200, a Mn of 1,848, and a polydispersity of 1.19.

EXAMPLE 12

A portion (3.24 g, 0.005 m) of the disulfonyl chloride of Example 1 was reacted with piperazine (0.43 g, 0.005 m) for 4.0 hrs and the solid product isolated as in Example 7. The red polysulfonamide colorant had a Mw of 10,716, a Mn of 4,678, and a polydispersity of 2.29.

EXAMPLE 13

A portion (3.22 g, 0.005 m) of the disulfonyl chloride of Example 5 (3.22 g, 0.005 m) was added portionwise to a solution of 2,2-dimethyl-1,3-propanediamine (0.51 g, 0.005 m) and tri-n-butylamine (1.85 g, 0.01 m) in DMF (20 ml) and the reaction mixture was heated at 90–95° C. for 1.0 hr. The reaction mixture was cooled to room temperature and then drowned into ethanol (200 ml) to precipitate the solid greenish-blue polysulfonamide colorant which was collected by filtration, washed with ethanol, and dried in air (yield—0.75 g). The polysulfonamide colorant had a Mw of 2,540, a Mn of 2,001, a polydispersity of 1.27, a Tg at 80° C. and a Tm at 250° C. In DMF solution, an absorption maximum ($\lambda$ max) was observed at 631 nm in the UV-visible absorption spectrum.

EXAMPLE 14

A portion of the disulfonyl chloride of Example 2 (3.50 g, 0.005 m) was added portionwise with good stirring to a solution of 2,2-dimethyl-1,3-propanediamine (0.51 g, 0.005 m) and tri-n-butylamine (1.85 g, 0.01 m) in DMF (30 ml) and the reaction mixture was heated at 90–95° C. for 1.0 hr. After cooling, the reaction mixture was drowned into methanol (200 ml) with stirring. The blue polysulfonamide colorant was collected by filtration, washed with methanol, and dried in air (yield—1.85 g) and had a Mw of 6,930, a Mn of 5,145, a polydispersity of 1.35, a Tg of about 80° C. and a melting temperature of about 250° C. In a DMF solution, absorption maxima were observed at 579 and 624 nm in the UV-visible light absorption spectrum.

EXAMPLE 15

A portion of the disulfonyl chloride of Example 2 was added portionwise with good stirring to a solution of hexamethylene diamine (0.58 g, 0.005 m) and tri-n-butylamine (1.85 g, 0.01 m) in N-methyl-2-pyrrolidinone (10.0 ml) and the reaction mixture was heated at 90–95° C. for 4.0 hr. After cooling, the reaction mixture was drowned with stirring into methanol (200 ml). The precipitated blue polysulfonamide colorant was collected by filtration, washed with acetone, and dried in air (0.75 g) and had a Mw of 4,976, a Mn of 1,081, and a polydispersity of 4.60.

EXAMPLE 16

A portion (3.50 g, 0.005 m) of the disulfonyl chloride of Example 2 was added portionwise with good stirring to a solution of piperazine (0.43 g, 0.005 m) and tri-n-butylamine (1.85 g, 0.01 m) dissolved in DMF (20 ml) and the reaction mixture was heated at 90° C. for 3.0 hrs. After cooling to 40° C., the reaction mixture was added to acetone (200 ml) with stirring. The blue polysulfonamide solid colorant which precipitated was collected by filtration, washed with acetone, and dried in air (1.3 g) and had a Mw of 19,858, a Mn of 10,946, and a polydispersity of 1.81.

EXAMPLE 17

A portion (3.50 g, 0.005 m) of the disulfonyl chloride of Example 2 was added portionwise to a solution of N,N'-dimethylhexamethylene diamine (0.72 g, 0.005 m) and tri-n-butylamine (1.85 g, 0.01 m) and the stirred reaction mixture heated for 3.5 hrs at about 95° C. The reaction mixture was cooled and drowned with stirring into methanol (200 ml) to precipitate the blue polysulfonamide colorant which was collected by filtration, washed with methanol, and dried in air (yield 2.5 g) and which had a Mw of 2,828, a Mn of 1,329, and a polydispersity of 2.12.

EXAMPLE 18

One fourth of the water-wet disulfonyl chloride of Example 6 was added with good stirring to a solution of 2,2-dimethyl-1,3-propanediamine (1.02 g, 0.01 m) and tri-n-butylamine (3.7 g, 0.02 m) dissolved in DMF (80 ml) and the reaction mixture was heated at 90–95° C. for 2.5 hrs. After cooling, the reaction mixture was drowned into methanol (400 ml) with stirring. The green polysulfonamide colorant which was collected by filtration, washed with methanol, and dried in air (yield—3.1 g) had a Mw of 3,308, a Mn of 1,873, and a polydispersity of 1.76.

EXAMPLE 19

One third of the water-wet disulfonyl chloride of Example 4 was added portionwise to a stirred solution of 2,2-dimethyl-1,3-propanediamine (1.35 g, 0.0133 m) and tri-n-butylamine (0.0266 m) dissolved in DMF (60 ml) and the reaction mixture was heated at 90–95° C. for 3.0 hrs. After cooling, the reaction mixture was drowned with stirring into methanol (400 ml) and the product collected by filtration, washed with methanol, and dried in air (yield—5.7 g). The yellow polysulfonamide colorant had a Mw of 3,771, a Mn of 2,471, and a polydispersity of 1.53.

EXAMPLE 20

A portion (2.46 g, 0.004 m) of the yellow disulfonyl chloride of Example 3 was added portionwise with stirring to a solution of 2,2-dimethyl-1,3-propanediamine (0.41 g, 0.004 m) dissolved in DMF (25 g). Sodium bicarbonate (0.67 g, 0.008 m) was added and the reaction mixture was stirred and heated at about 140° C. for 5.5 hrs. After water was added to the cooled reaction mixture to precipitate the yellow polysulfonamide colorant which was collected by filtration, washed with methanol, and dried in air (yield—2.86 g). An absorption maximum ($\lambda$ max) was observed at 445 nm in the UV-visible light absorption spectrum in DMF solvent.

EXAMPLE 21 (Polyamide Containing Approx. 300 ppm Polysulfonamide Colorant)

Three hundred grams of nylon 6,6 polyamide pellets (ZYTEL 101, DuPont) were mixed with the colorant of Example 7 (0.09 g) and acetone (10 g) and blended. Most of acetone was allowed to evaporate by placing the blend in an evaporating dish in a hood having good air flow. The mixture was then dried under vacuum at 85° C. for 16 hours and then extruded using a C. W. Brabender ¾ inch extruder at 280° C. into pellets. Transparent bluish red pellets were obtained, thus indicating solubility of the polysulfonamide colorant. No sublimation of the colorant was observed and good color development resulted.

EXAMPLE 22

Example 21 was repeated using 0.09 g of the polysulfonamide colorant of Example 13 to produce transparent greenish-blue pellets having good color development.

EXAMPLE 23

Example 21 was repeated using 0.09 g of the polysulfonamide colorant of Example 14 to produce transparent pellets having a strong blue color.

EXAMPLE 24

Example 21 was repeated using 0.09 g of the polysulfonamide colorant of Example 19 to produce transparent pellets having a strong reddish yellow color.

EXAMPLE 25

The following materials were placed in a 500 mL, three-necked, round bottom flask:
- 97.0 g (0.50 m) dimethyl terephthalate
- 42.8 g (0.69 m) ethylene glycol
- 22.3 g (0.155 m) 1,4-cyclohexanedimethanol
- 0.19 mL of a n-butanol solution of acetyl-triisopropyl titanate which contains 0.00057 g Ti
- 0.93 mL of an ethylene glycol solution of $Mn(OCOCH_3)_2 \cdot 4H_2O$ which contains 0.0045 g Mn
- 0.0324 g blue polysulfonamide of Example 14 (~300 ppm).

The flask was equipped with a nitrogen inlet, stirrer, vacuum outlet, and condensing flask. The flask and contents were heated in a Belmont metal bath for 60 minutes at 200° C. and then for 60 minutes at 225° C. with a nitrogen sweep over the reaction mixture. Phosphoric acid (85%)(1.02 mL) was then added and the temperature increased to 282° C. After heating the reaction mixture at about 282° C. for 25 minutes, a vacuum with a slow stream of nitrogen bleeding into the system was applied and the pressure reduced to about 200 mmHg over 5 min. The pressure was further reduced to 100 mmHg and then to 20 mm over about 5 minute intervals. Full vacuum was applied and the polycondensation reaction continued for about 45 minutes at a pressure of about 0.1 to 0.5 mmHg. The flask was removed from the metal bath and allowed to cool in a nitrogen atmosphere while the polymer solidified. The bright blue polymer had an inherent viscosity (I.V.) of 0.64 as measured in a 60/40 ratio by weight of phenol/tetrachloroethane at a concentration of 0.5 g/100 mL. A film sample was prepared by grinding the polymer in a Wiley mill, followed by compression molding approximately 1 g of granules of the polymer using 2-inch diameter, circular mold at 285° C. and 4500 pounds ram force (4 inch ram) in a Pasadona Hydraulic, Inc. press, followed by quenching, to produce an amorphous film having a thickness of approximately 14 mils. The color was tested for lightfastness by exposing a portion of the film to Xenon Arc Lamp for 160 AATCC Fading Units (American Association of Textile Chemists and Colorists-AATCC Test Method16E-Colorfastness to Light; Water-Cooled Xenon Arc Lamp). There was no observable loss of color.

EXAMPLE 26

Example 25 was repeated exactly except the red polysulfonamide colorant (0.0324 g) of Example 7 was used to produce a transparent red polyester film. Similar lightfading results were obtained after 160 AATCC Fading Units of exposure 25 was reported in Example 25, using the same test method. The polymer had an I.V. of 0.657.

EXAMPLE 27

Example 25 was repeated using the polysulfonamide colorant (0.0324 g) of Example 13 to produce a transparent greenish-blue polyester film. Lightfastness testing was carried out as in Example 25 with similar results. The polymer had an I.V. of 0.675.

EXAMPLE 28

Example 25 was repeated using the polysulfonamide colorant (0.0324 g) of Example 19 to produce a transparent yellow film. Light fastness testing was carried out as in Example 25 with similar results. The polymer had an I.V. of 0.63.

EXAMPLE 29—Use of Anthraquinone Polysulfonamides as Toners

The following materials were placed in a 500 mL, three-necked, round bottom flask:
- 97.0 g (0.50 m) dimethyl terephthalate
- 42.8 g (0.69 m) ethylene glycol
- 22.3 g (0.155) 1,4- cyclohexanedimethanol
- 0.19 mL of a n-butanol solution of acetyl-triisopropyl titanate which contains 0.00057 g Ti
- 0.93 mL of an ethylene glycol solution of $Mn (OCOCH_3)_2 \cdot 4H_2O$ which contains 0.0045 g Mn

---

| | |
|---|---|
| 97.0 g | (0.50 m) dimethyl terephthalate |
| 42.8 g | (0.69 m) ethylene glycol |
| 22.3 g | (0.155) 1,4-cyclohexanedimethanol |
| 0.19 mL | of a n-butanol solution of acetyl-triisopropyl titanate which contains 0.00057 g Ti |
| 0.93 mL | of an ethylene glycol solution of $Mn (OCOCH_3)_2 \cdot 4H_2O$ which contains 0.0045 g Mn |
| 1.8 g | polymer of Example 25 } Toner |
| 0.9 g | polymer of Example 26 |

---

The polycondensation reaction was carried out exactly as described in Example 25. The polymer was cooled in liquid nitrogen (~–195° C.) and then broken into pieces, which were ground using a Wiley mill to pass through a 3 mm screen. Approximately 8.0 grams of the granules were molded into a circular chip approximately 1.5 inches in diameter and 125 mils thick in a Wabash hydraulic press (Wabash Metal Products, Wabash, Ind.) at ~245° C. at 20,000 lbs force for 1.0 minutes. Color measurement was made on the chip was made on a Hunter Lab color measurement device (Hunter Associates Laboratory) and the CIELAB-L*, a*, b* values measured (L*=86.27, a*=–1.8 and b*=+0.4).

The chromaticity dimensions (a* and b*) give designations of color as follows:
- a* measures redness when plus, gray when zero, and greeness when minus
- b* measures yellowness when plus, gray when zero, and blueness when minus The effectiveness of the toner system used above in eliminating the yellow color inherently produced during polyester production is shown by comparing the b* value for the polymer produced above to that of a "control" polymer of Comparative Example 1, below.

Comparative Example 1

Example 29 was repeated without any toner present to give a "control" polyester to test for color. Color measurement as described in Example 29, gave CIELAB-L*, a*, b* values as follows: L*=90.07, a*=−2.32, b*=5.27.

What is claimed is:

1. A colored thermoplastic composition which comprises at least one thermoplastic polymer having combined therewith at least one colorant having a weight average molecular weight of at least 1,500 of the formula:

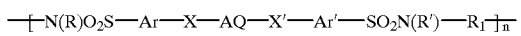

wherein:
AQ is a divalent anthraquinone radical which may be substituted with from 1 to 6 substituents which may be the same or different and are selected from the group consisting of $C_1$–$C_8$ alkyl, $C_1$–$C_8$ alkoxy, $C_1$–$C_8$ alkanoylamino, aroylamino, $C_1$–$C_8$ alkylthio, halogen, amino, nitro, $C_1$–$C_8$ alkylamino, $C_3$–$C_8$ cycloalkylamino, $C_1$–$C_8$ alkanoyl, $C_1$–$C_8$ alkoxycarbonyl, trifluoromethyl, cyano, $C_3$–$C_8$ cycloalkoxy, $C_3$–$C_8$ cycloalkylthio, heteroarylthio, $C_1$–$C_8$ alkylsulfonyl, arylsulfonyl, aroyl, carbamoyl, sulfamoyl, $C_1$–$C_8$ alkylsulfonamido, arylsulfonamido, arylthio, aryloxy, arylamino, and hydroxy groups;

X and X' are independently selected from the group consisting of Y, —Y—alkylene, —Y— (alkylene—Y'-)-$_m$, —Y—alkylene—$C_3$–$C_8$-cycloalkylene, Y—$C_3$–$C_8$-cycloalkylene—Y', and Y—alkylene—$C_3$–$C_8$-cycloalkylene-alkylene—Y', wherein m is 1–3, and Y and Y' are independently —O—, —S—, —N(R)CO—, —N(R)SO$_2$—, or —N(R$_2$)—;

Ar and Ar' are independently a divalent benzene or naphthalene radical which may be substituted with from 1 to 4 substituents which may be the same or different and are selected from the group consisting of $C_1$–$C_8$ alkyl, $C_1$–$C_8$ alkoxy, $C_1$–$C_8$ alkanoylamino, aroylamino, $C_1$–$C_8$ alkylthio or halogen groups;

R and R' are hydrogen, $C_1$–$C_8$ alkyl, $C_3$–$C_8$ cycloalkyl, heteroaryl or aryl;

$R_1$ is a divalent organic radical, with the proviso that when $R_1$ is ethylene, R and R' may be combined to represent an ethylene radical;

$R_2$ is hydrogen, $C_1$–$C_8$ alkyl, $C_3$–$C_8$ cycloalkyl, $C_1$–$C_8$ alkanoyl, aroyl, $C_1$–$C_8$ alkylsulfonyl, arylsulfonyl, carbamoyl, or sulfamoyl; and n is an integer of from about 3 to about 30.

2. The thermoplastic composition of claim 1 wherein $R_1$ is $C_2$–$C_{12}$ alkylene, $C_3$–$C_8$ cycloalkylene, carbocyclic or heterocyclic arylene and the $C_2$–$C_{12}$ alkylene group may contain one or more hetero atoms, cyclic groups or ester/amide groups within or attached to the main chain of the alkylene group.

3. The thermoplastic composition of claim 2 wherein $R_1$ is an alkylene group which contains within or attached to said alkylene group one or more moieties selected from the group consisting of oxygen, sulfur, or nitrogen atoms, substituted nitrogen, $C_3$–$C_8$ cycloalkylene, carbocyclic arylene, or divalent aromatic heterocyclic groups.

4. The thermoplastic composition of claim 1 wherein the thermoplastic polymer is a homopolymer or copolymer selected from the group consisting of polyesters, polyamides, polycarbonates, acryonitriles, cellulose esters, polyimides, polyester amides, polystyrenes, polyurethanes, acrylics, vinyl polymers, polyolefins, and mixtures thereof.

5. The thermoplastic composition of claim 1 wherein the thermoplastic polymer is selected from the group consisting of homopolymer and copolymers of poly(ethylene terephthalate), polyethylene, polypropylene, polybutylene, nylon 6, nylon 66, polyvinyl chloride, polyvinylidene chloride, cellulose acetate, cellulose propionate, cellulose butyrate, poly(methyl methacrylate), acrylonitrile-butadiene-styrene copolymers, styrene-acryonitrile copolymers, and mixtures thereof.

6. The thermoplastic composition of claim 1 wherein the thermoplastic polymer and the colorant are combined by melt blending.

7. The thermoplatic composition of claim 1 wherein the thermoplatic polymer and the colorant are combined by solvent blending.

8. The thermoplastic composition of claim 1 wherein the at least one colorant is present in an amount of from about 0.001 percent to about 10 percent based on the weight of the thermoplastic composition.

9. The thermoplastic comosition of claim 1 wherein the at least one colorant is present in an amount of from about 1 to about 10 parts per million based on the weight of the thermoplastic composition.

10. A method of forming a thermoplastic composition which comprises melting a thermoplastic polymer and blending therewith a colorant having a weight average molecular weight of at least 1,500 of the formula:

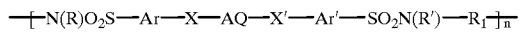

wherein:
AQ is a divalent anthraquinone radical which may be substituted with from 1 to 6 substituents which may be the same or different and are selected from the group consisting of $C_1$–$C_8$ alkyl, $C_1$–$C_8$ alkoxy, $C_1$–$C_8$ alkanoylamino, aroylamino, $C_1$–$C_8$ alkylthio, halogen, amino, nitro, $C_1$–$C_8$ alkylamino, $C_3$–$C_8$ cycloalkylamino, $C_1$–$C_8$ alkanoyl, $C_1$–$C_8$ alkoxycarbonyl, trifluoromethyl, cyano, $C_3$–$C_8$ cycloalkoxy, $C_3$–$C_8$ cycloalkylthio, heteroarylthio, $C_1$–$C_8$ alkylsulfonyl, arylsulfonyl, aroyl, carbamoyl, sulfamoyl, $C_1$–$C_8$ alkylsulfonamido, arylsulfonamido, arylthio, aryloxy, arylamino, and hydroxy groups;

X and X' are independently selected from the group consisting of Y, —Y—alkylene, —Y— (alkylene—Y'-)-$_m$, —Y—alkylene—$C_3$–$C_8$-cycloalkylene, Y—$C_3$–$C_8$-cycloalkylene—Y', and Y—alkylene—$C_3$–$C_8$-cycloalkylene—alkylene—Y', wherein m is 1–3, and Y and Y' are independently —O—, —S—, —N(R)CO—, —N(R)SO$_2$—, or —N(R$_2$)—;

Ar and Ar' are independently a divalent benzene or naphthalene radical which may be substituted with from 1 to 4 substituents which may be the same or different and are selected from the group consisting of $C_1$–$C_8$ alkyl, $C_1$–$C_8$ alkoxy, $C_1$–$C_8$ alkanoylamino, aroylamino, $C_1$–$C_8$ alkylthio or halogen groups;

R and R' are hydrogen, $C_1$–$C_8$ alkyl, $C_3$–$C_8$ cycloalkyl, heteroaryl or aryl;

$R_1$ is a divalent organic radical, with the proviso that when $R_1$ is ethylene, R and R' may be combined to represent an ethylene radical;

$R_2$ is hydrogen, $C_1$–$C_8$ alkyl, $C_3$–$C_8$ cycloalkyl, $C_1$–$C_8$ alkanoyl, aroyl, $C_1$–$C_8$ alkylsulfonyl, arylsulfonyl, carbamoyl, or sulfamoyl; and n is an integer of from about 3 to about 30.

11. The method of claim 10 wherein $R_1$ is $C_2-C_{12}$ alkylene, $C_3-C_8$ cycloalkylene, carbocyclic or heterocyclic arylene and the $C_2-C_{12}$ alkylene group may contain one or more hetero atoms, cyclic groups or ester/amide groups within or attached to the main chain of the alkylene group.

12. The method of claim 11 wherein the $C_2-C_{12}$ alkylene group further comprises one or more oxygen, sulfur, or nitrogen atoms, substituted nitrogen, $C_3-C_8$ cycloalkylene, carbocyclic arylene, or divalent aromatic heterocyclic groups within or attached to the main chain of the alkylene group.

13. The method of claim 10 wherein the thermoplastic polymer is a homopolymer or copolymer of polyesters, polyamides, polycarbonates, acryonitriles, cellulose esters, polyimides, polyester amides, polystyrenes, polyurethanes, acrylics, vinyl polymers, polyolefins, and mixtures thereof.

14. The method of claim 10 wherein the thermoplastic polymer is selected from the group consisting of homopolymer and copolymers of poly(ethylene terephthlate), polyethylene, polypropylene, polybutylene, nylon 6, nylon 66, polyvinyl chloride, polyvinylidene chloride, cellulose acetate, cellulose propionate, cellulose butyrate, poly (methyl methacrylate), acrylonitrile-butadiene-styrene copolymers, styrene-acrylonitrile copolymers, and mixtures thereof.

15. The method of claim 10 wherein the thermoplastic polymer and the colorant are combined by melt blending.

16. The method of claim 10 wherein the thermoplastic polymer and the colorant are combined by solvent blending.

17. The method of claim 10 wherein the colorant is present in an amount of from about 0.001 percent to about 10 percent based on the weight of the thermoplastic composition.

18. The method of claim 10 wherein the colorant is present in an amount of from about 1 to about 10 parts per million based on the weight of the thermoplastic composition.

19. A colored thermoplastic composition which comprises at least one thermoplastic polymer having combined therewith at least one colorant having a weight average molecular weight of at least 1,500 having a unit of the formula:

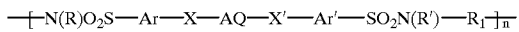

wherein:

AQ is a divalent anthraquinone radical which may be substituted with from 1 to 6 substituents which may be the same or different and are selected from the group consisting of $C_1-C_8$ alkyl, $C_1-C_8$ alkoxy, $C_1-C_8$ alkanoylamino, aroylamino, $C_1-C_8$ alkylthio, halogen, amino, nitro, $C_1-C_8$ alkylamino, $C_3-C_8$ cycloalkylamino, $C_1-C_8$ alkanoyl, $C_1-C_8$ alkoxycarbonyl, trifluoromethyl, cyano, $C_3-C_8$ cycloalkoxy, $C_3-C_8$ cycloalkylthio, heteroarylthio, $C_1-C_8$ alkylsulfonyl, arylsulfonyl, aroyl, carbamoyl, sulfamoyl, $C_1-C_8$ alkylsulfonamido, arylsulfonamido, arylthio, aryloxy, arylamino, and hydroxy groups;

X and X' are independently selected from the group consisting of Y, —Y—alkylene, —Y— (alkylene—Y'-)-$_m$, —Y—alkylene—$C_3-C_8$-cycloalkylene, Y—$C_3-C_8$-cycloalkylene—Y', and Y—alkylene—$C_3-C_8$-cycloalkylene—alkylene—Y', wherein m is 1–3, and Y and Y' are independently —O—, —S—, —N(R)CO—, —N(R)SO$_2$—, or —N(R$_2$)—;

Ar and Ar' are independently a divalent benzene or naphthalene radical which may be substituted with from 1 to 4 substituents which may be the same or different and are selected from the group consisting of $C_1-C_8$ alkyl, $C_1-C_8$ alkoxy, $C_1-C_8$ alkanoylamino, aroylamino, $C_1-C_8$ alkylthio or halogen groups;

R and R' are hydrogen, $C_1-C_8$ alkyl, $C_3-C_8$ cycloalkyl, heteroaryl or aryl;

$R_1$ is a divalent organic radical, with the proviso that when $R_1$ is ethylene, R and R' may be combined to represent an ethylene radical;

$R_2$ is hydrogen, $C_1-C_8$ alkyl, $C_3-C_8$ cycloalkyl, $C_1-C_8$ alkanoyl, aroyl, $C_1-C_8$ alkylsulfonyl, arylsulfonyl, carbamoyl, or sulfamoyl; and n is an integer of from about 3 to about 30.

20. The thermoplastic composition of claim 19 wherein the thermoplastic polymer is a homopolymer or copolymer selected from the group consisting of polyesters, polyamides, polycarbonates, acryonitriles, cellulose esters, polyimides, polyester amides, polystyrenes, polyurethanes, acrylics, vinyl polymers, polyolefins, and mixtures thereof.

* * * * *